Jan. 25, 1944. J. R. ALBERS 2,339,749
FIELD CONTROL FOR WIND DRIVEN GENERATORS
Filed Dec. 22, 1941
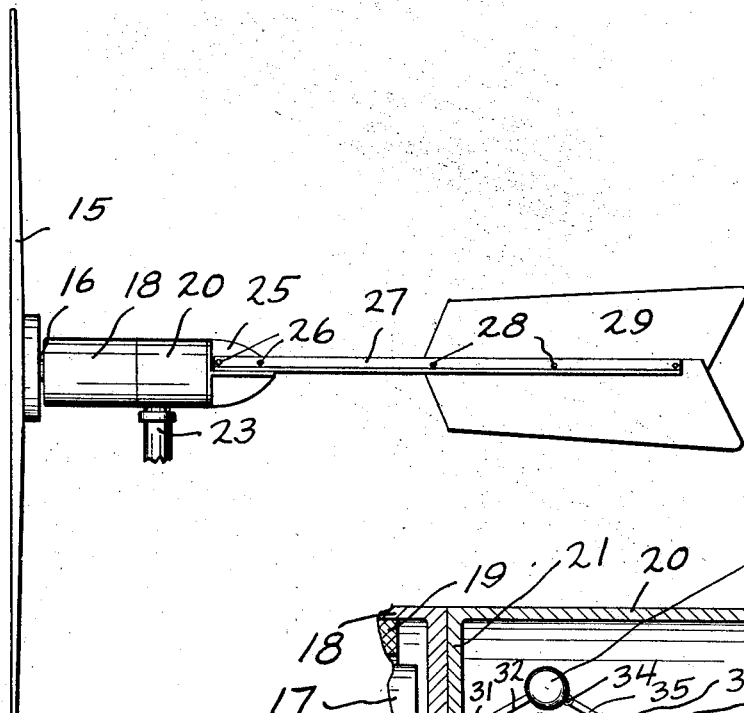
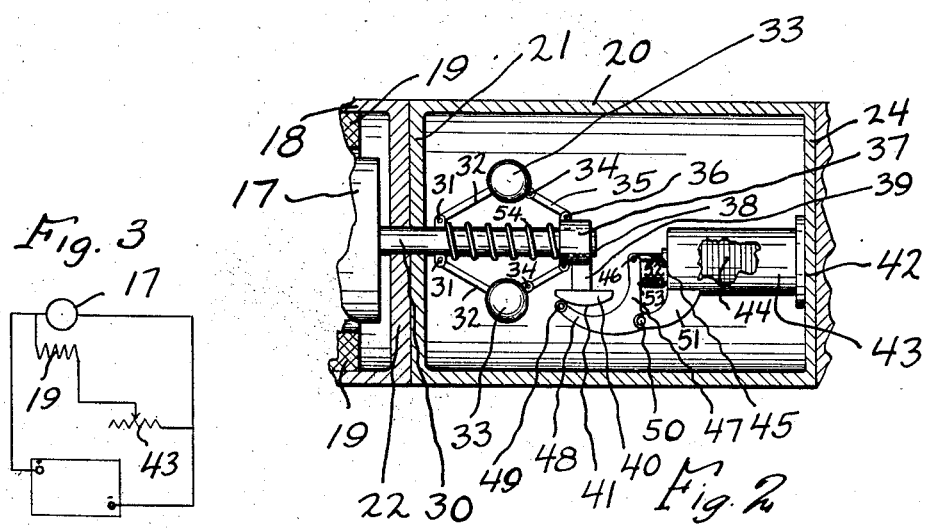
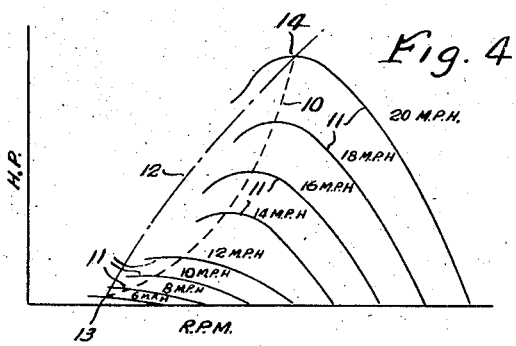
INVENTOR
John R. Albers
BY
Sam J. Slotsky
ATTORNEY Patented Jan. 25, 1944

2,339,749

UNITED STATES PATENT OFFICE 2,339,749

FIELD CONTROL FOR WIND DRIVEN GENERATORS

John R. Albers, Sioux City, Iowa, assignor to Wincharger Corporation, Sioux City, Iowa, a corporation of Minnesota Application December 22, 1941, Serial No. 424,030

6 Claims. (Cl. 290—44)

My invention pertains to wind driven apparatus.

An object of my invention is to co-relate the power requirements of wind driven generators to the power output characteristics of wind driven impellers, by matching as uniformly as possible the generator input curve to the impeller output curve, impeller curve consisting of points of maximum efficiency for the various wind velocities, so that the horse power input curve of the generator will be coincident with the horse power output curve of the impeller.

A further object of my invention is to provide means whereby the characteristics of the generator are gradually and uniformly changed for the above purpose.

A further object of my invention is to provide means for gradually and uniformly inserting external resistance into the generator field circuit as the impeller speed increases, and thence withdrawing such resistance from the field as the propeller speed increases still further.

A further object of my invention is to provide a resistance controlling mechanism which mechanism can be adjusted to provide the desired amount of resistance to accommodate any particular generator-impeller combination.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1 is a side elevation of a wind operated charging generator of the type useable with my invention, Figure 2 is an enlarged detail of the operating mechanism, Figure 3 is a schematic view of the electrical circuit of the arrangement, Figure 4 is a chart of typical curves for impellers and generators therefor.

My invention contemplates the provision of means for matching a maximum efficiency impeller curve together with the generator attached thereto as will be apparent from the description which follows.

Wind driven impellers of the type used for driving generators have certain fixed characteristics wherein the efficiency of the blade or power generated by the impeller will vary as the cube of the wind velocity. This is a natural function of wind forces and cannot be altered. The impeller power curve will be indicated generally as shown in Figure 4 wherein the dotted line indicated by the character 10 represents the points of maximum power efficiency of a typical impeller in various wind velocities wherein the vertical ordinates represents horse power and the horizontal ordinates represents revolutions per minute of the impeller. The various curves determining the power output in revolutions per minute are indicated by the solid lines character 11, it being noted that the curve 10 intersects these lines at their maximum points, or at the points of maximum efficiency or horse power for the given wind speed.

A typical generator curve is indicated by the character 12 or by the line including the elongated dash portions and short dash portions. Usually only two points such as 13 and 14 will be coincident on the curves 12 and 10. However, the objective is to carry the line 12 over to and coincident with the curve 10 throughout in order to obtain the best possible results and to provide generator input characteristics which match the impeller power output characteristics. This will then allow the impeller to give up its maximum amount of power at any certain wind velocity due to the generator horse power requirement being identical to that which the impeller is best capable of producing.

I have further used the character 15 to designate an impeller comprising a pair of blades attached to a shaft 16 which drives the rotor 17 rotatably secured in a suitable generator casing 18 have the field poles 19. Attached at the rear end of the generator casing 18 is a cylindrical housing 20 which is attached by means of a flange 21 to the flange 22 of the generator casing 18. The casing 20 can be sutiably mounted on the turntable 23 and attached at the rear of the casing 20 to the flanged portion 24 thereof is a tail vane supporting flange 25 to which is attached at 26 the rearwardly extending angle member 27 to which is attached at 28 the sheet metal vane 29, said vane being adapted to maintain the impeller blades 15 directly into the wind. The rotor 17 is attached to a shaft 30 which is rotatably received within the flanges 21 and 22 and attached to the shaft 30 are the ears 31 from which are pivoted links 32 which links are attached to the fly balls 33.

Attached to the balls 33 are the ears 34 from which are attached further links 35 which links are pivoted to ears at 36 which ears are attached to the collar 37 which collar 37 is adapted to slide along the shaft 30. Attached at 38 to the collar 37 is the post 39 which terminates in a cam 40 which cam includes the lower cam surface 41 having the certain characteristics which will be described. Attached at 42 to the wall 24 is a carbon pile resistor casing 43 which receives the carbon discs 44 said discs being actuated for snug or loose engagement by means of a plunger 45 which is pivoted at 46 to a rocker arm 47 which arm 47 extends into a further portion 48 at the termination of which is mounted the small roller 49 which roller bears against the cam surface 41. The rocker arm 47 is pivoted at 50 to a bracket 51 which is attached to the resistor casing 43 and a tension spring 52 is attached at 53 to the rocker arm 47 and to the resistor casing 43.

Receiving the shaft 30 is the helical compression spring 54 which is positioned between the collar 37 and the ears 31.

It will now be noted from the foregoing description that when the speed of rotation of the impeller 15 attains a predetermined R. P. M. the balls 33 will be centrifugally urged outwardly and to the left as viewed in Figure 2 thereby carrying the collar 37 toward the left as well as the cam 40.

Due to the engagement of the cam surface 41 with the roller 49 this movement will correspondingly cause the rocker arm 47 to rotate slightly in a counter-clockwise direction and will thereby release the pressure of the plunger 45 on the carbon pile 44 which inserts a varying resistance in the field circuit 19 as shown by the diagram in Figure 3. At the lowest point of the curve 61 the pressure on the carbon discs will be the least, and the resistance will be the greatest. However, as the speed of the impeller increases still further, the roller 49 will then continue to bear against the higher portions of the cam whereby the rocker arm 47 will be drawn by the spring 52 carrying the plunger 45 against the carbon pile and thereby reducing the resistance in the field circuit 19. Thus, the resistance is inserted in the field as the speed increases and is then reduced as the speed continues to increase above a predetermined point.

The cam surface 41 is formed of a suitable contour to provide the required resistance at the points corresponding to the loci of the points of the dotted line 10 in Figure 4 so that the horse power characteristics of the generator will follow directly the curve 10 of the propeller, thereby providing the results desired in a gradual and uniform change in the generator necessary to match the impeller output characteristics.

It will now be seen that I have provided all of the advantages set forth in the object of my invention with further advantages being readily apparent.

Some changes may be made in the construction and arrangement of the parts of my invention without departing from the real spirit and purpose of my invention and it is my intention to cover by my claims any modified forms of structure or use of mechanical equivalents which may be reasonably included within their scope.

I claim as my invention:

1. The method of controlling an impeller driven electrical generating unit which comprises operating the generator of such unit at low wind velocities with very little external resistance in the field circuit thereof, then, at velocities above a predetermined lower value, in gradually inserting resistance in the said field circuit to permit the impeller to carry its load efficiently at wind velocities increasing above the predetermined lower value, and in then gradually decreasing the resistance in said field circuit as the wind velocity continues to increase still further above the predetermined lower value.

2. A mechanism for controlling an impeller driven electrical generating unit which comprises means for operating the generator of such unit at low wind velocities with very little external resistance in the field circuit thereof, means for gradually inserting resistance in the said field circuit at velocities above a predetermined lower value to permit the impeller to carry its load efficiently at wind velocities increasing above the predetermined lower value, and means for gradually decreasing the resistance in said field circuit as the wind velocity continues to increase still further above the predetermined lower value, said last two means including a ball governor attached to the generator shaft, a resistor adjacent thereto, means actuating said resistor and cooperant with said ball governor to gradually increase the resistance in said field circuit at said speeds increasing above said predetermined lower value, and thence gradually decrease said resistance as the said speed continues to increase still further above the predetermined lower value.

3. A mechanism for controlling an impeller driven electrical generating unit which comprises means for operating the generator of such unit at low wind velocities with very little external resistance in the field circuit thereof, means for gradually inserting resistance in the said field circuit at velocities above a predetermined lower value to permit the impeller to carry its load efficiently at wind velocities increasing above the predetermined lower value, and means for gradually decreasing the resistance in said field circuit as the wind velocity continues to increase still further above the predetermined lower value, said last two means including a ball governor attached to the generator shaft, a resistor adjacent thereto, means actuating said resistor and cooperant with said ball governor to gradually increase the resistance in said field circuit at said speeds increasing above said predetermined lower value, and thence gradually decrease said resistance as the said speed continues to increase still further above the predetermined lower value, said actuating means including a cam surface attached to said ball governor, said resistor unit being cooperatively engaged with said cam surface to vary the resistance in the field circuit according to the predetermined necessary values for correlating the impeller output with the generator input at all speeds thereof.

4. A mechanism for controlling an impeller driven electrical generating unit which comprises means for operating the generator of such unit at low wind velocities with very little external resistance in the field circuit thereof, means for gradually inserting resistance in said field circuit at velocities above a predetermined lower value in such amounts as to cause the impeller to carry its load efficiently at wind velocities increasing above the predetermined lower value, and means for gradually decreasing the resistance in said field circuit as the wind velocity continues to increase still further above the predetermined lower value, said last two means including a ball governor attached to the generator shaft, a resistor adjacent thereto, means actuating said resistor and cooperant with said ball governor to gradually increase the resistance in said field circuit at said speeeds increasing above a predetermined lower value, and thence gradually decreases said resistance as the said speed continues to increase still further above the predetermined lower value, said actuating means including a cam surface attached to said ball governor, said resistor unit being cooperatively engaged with said cam surface to vary the resistance in the field circuit according to the predetermined necessary values for correlating the impeller output with the generator input at all speeds thereof, said resistor including a carbon pile, and means for operating said carbon pile from said cam surface to provide snug or loose engagement thereof.

5. Apparatus for controlling an impeller driven electrical generating unit comprising a generator driven by a wind impeller, and means for operating said generator at low wind velocities with small external resistance in the field circuit of said generator, for gradually inserting resistance in said field circuit at velocities above a predetermined lower velocity to cause the impeller to transfer energy efficiently from the wind to said generator at velocities above said predetermined lower velocity, and for gradually decreasing the resistance in said field circuit as the wind velocity continues to increase still further above said predetermined lower velocity.

6. Apparatus for controlling an impeller driven electrical generating unit comprising a generator driven by a wind impeller, and centrifugal means for operating said generator at low wind velocities with small external resistance in the field circuit of said generator, for gradually inserting resistance in said field circuit at velocities above a predetermined lower velocity to cause the impeller to transfer energy efficiently from the wind to said generator at velocities above said predetermined lower velocity, and for gradually decreasing the resistance in said field circuit as the wind velocity continues to increase still further above said predetermined lower velocity.

JOHN R. ALBERS.